United States Patent [19]

Mailfert et al.

[11] 4,034,245

[45] July 5, 1977

[54] SYNCHRONOUS ELECTRICAL MACHINE HAVING A SUPERCONDUCTIVE FIELD WINDING

[75] Inventors: Alain Mailfert, Morsang-sur-Orge; Michel Renard, Grenoble, both of France

[73] Assignee: Agence Nationale de Valorisation de la Recherche (ANVAR), France

[22] Filed: May 5, 1975

[21] Appl. No.: 574,342

Related U.S. Application Data

[63] Continuation of Ser. No. 443,014, Feb. 15, 1974, abandoned.

[30] Foreign Application Priority Data

Feb. 21, 1973 France .................... 73.06118
Jan. 7, 1974 France .................... 74.00387

[52] U.S. Cl. .................... 310/52; 310/162
[51] Int. Cl.² .................... H02K 2/00
[58] Field of Search ............ 310/10, 40, 52, 161, 310/162–164, 166, 165, 198, 54, 64

[56] References Cited

UNITED STATES PATENTS

| 3,471,726 | 10/1969 | Burnier | 310/54 |
| 3,644,766 | 2/1972 | Hughes | 310/40 |
| 3,648,082 | 3/1972 | MacNab | 310/10 |
| 3,657,580 | 4/1972 | Doyle | 310/10 |
| 3,679,920 | 6/1972 | MacNab | 310/10 |
| 3,742,265 | 6/1973 | Smith | 310/52 |
| 3,743,867 | 7/1973 | Smith | 310/52 |
| 3,764,835 | 10/1973 | Luck | 310/52 |
| 3,772,543 | 11/1973 | Woodson | 310/52 |
| 3,781,578 | 12/1973 | Smith | 310/52 |
| 3,809,933 | 5/1974 | Sugawara | 310/10 |

Primary Examiner—R. Skudy
Attorney, Agent, or Firm—Larson, Taylor and Hinds

[57] ABSTRACT

A synchronous electrical alternator has a superconducting field winding and armature windings. An auxiliary winding is carried by the shaft receiving motive power and a source circulates in the auxiliary winding a D.C. current of such amplitude that it compensates the torque tending to rotate the field winding with respect to the shaft.

13 Claims, 5 Drawing Figures

SYNCHRONOUS ELECTRICAL MACHINE HAVING A SUPERCONDUCTIVE FIELD WINDING

This is a continuation of application Ser. No. 443,014 filed Feb. 15, 1974, now abandoned.

BACKGROUND OF THE INVENTION

The invention relates to synchronous electrical machines and particularly but not exclusively to synchronous alternators for converting mechanical power applied on a rotating input shaft of the alternator into electrical alternating currents (a.c.).

The use of superconductors for at least some windings of a rotating electrical machine has already been proposed, the great attraction of superconductors being that very heavy currents can flow through them with very low losses and, correspondingly, the conductor size required for a particular current flow is very small indeed. However, a superconducting winding be maintained at a very low temperature. The direct coupling between the rotating field winding and the driving plant in known systems forms a heat leakage path and a very high power cooling or refrigerating facility should be provided.

Electrical machines having a rotating superconductive field winding are also known wherein a shaft having a short-circuited winding or squirrel cage is disposed between the field and a stationary stator winding, the shaft receiving the mechanical input in the case of the alternator and providing a mechanical output in the case of a motor. Machines of that type are disclosed in French Patent specification No. EN 72 38 967 of the assignee of the present invention corresponding to U.S. patent application No. 412,127 as well as in U.S. Pat. No. 3,742,265 (Smith). However, such machines are inherently asynchronous (i.e., the rotating magnetic field of the shaft slips relatively to the field produced by the field winding) and for many uses and particularly electricity production synchronous operation is preferable.

SUMMARY OF THE INVENTION

It is an object of the invention to provide a synchronous electrical machine having a superconductive field winding which performs better in practice than similar prior-art machinery, inter alia because its heat losses are very low.

For this purpose, there is provided a polyphase synchronous electrical rotating machine comprising a superconductive D.C. field winding which is mounted for rotation inside stationary windings (armature winding) adapted to produce a rotating field when polyphase alternating currents (a.c's) circulate therein. The field winding is disposed coaxially of a rotating shaft carrying an auxiliary winding. An exciting circuit is adapted to energize the auxiliary winding with a field-producing d.c., such current being varied in dependence upon the power component of the current flowing through the stationary windings to maintain the field winding and the auxiliary winding in synchronism, at least on the average.

In a particular embodiment of the invention, the exciting circuit is adapted to circulate in the auxiliary winding a current proportional to the active component of the a.c. The field winding can in this case be secured to the shaft by supports which are of low mechanical strength and have a high resistance to heat flow. In practice, the exciting circuit can include for detecting the torque tending to rotate the field winding relatively to the shaft and is so controlled as to continuously adjust the current to a value such that such torque is substantially zero.

The auxiliary winding may preferably be wound in phase quadrature with the field winding, so that the torque on the field winding can be cancelled by a small current flow through the auxiliary winding — i.e. with very reduced heat dissipation therein.

In another embodiment, the exciting circuit has means for adjusting the current in the auxiliary winding to a value such that the angular offset between the auxiliary-winding field and the field produced by the field winding, the same being freely rotatable relatively to the shaft, does not exceed a predetermined value which is less than 90°.

The resulting machine in this case is still synchronous but the angular offset between the axis of the field poles and the axis of the auxiliary rotating field is variable. For fulfilling that purpose a current which remains constant in all operating conditions and which is chosen to correspond to the limit value when the power component is maximum may for instance be circulated in the auxiliary winding. In this case, however, considerable power is wasted when the operating conditions are very different. What seems a more preferable solution is to select a range of phase angles and, when the phase shift departs from that range, e.g., of from 30° to 60°, to vary the current, possibly stepwise.

As compared with the machine of the first embodiment, control is simplified and a temporary amount of slips providing a return torque is allowed, thereby reducing the forces acting on the structure.

The auxiliary winding must be cooled in a power production machine. Flowing water is one possible form of cooling. The auxiliary winding may also be maintained at a temperature between the temperature of the superconductive field winding and the ambient temperature, in which event the auxiliary winding can be cooled by flowing liquid nitrogen.

The magnetic hysteresis of superconductive materials is such that, when such materials experience abrupt variations of magnetic field, they evolve heat to an extent incompatible with them remaining at the low temperatures essential for superconductivity. Advantageously, to prevent the field winding from being affected by rapid or periodic variations in the field of the field winding as a result of load variations), a rotating shield or screen is provided between the field winding and the stationary windings. An electrically conductive screen of this kind, which is known in the prior art synchronous machines having a superconductive field winding, can be of very similar construction to the dampers of conventional alternators. Inter alia the screen can take the form of a short-circuited winding which in steady-state operating conditions experiences no flux variation and therefore gives rise to no current. Another possibility is to use squirrel-cage bars. The bars forming the screen can be received in slots which also receive the auxiliary-winding conductors.

SHORT DESCRIPTION OF THE DRAWINGS

The invention will be more clearly understood from the following description of non-limitative embodiments of the invention given as way of examples, reference being made to the accompanying drawings, wherein.

DESCRIPTION OF PREFERRED EMBODIMENTS

Figure 2:
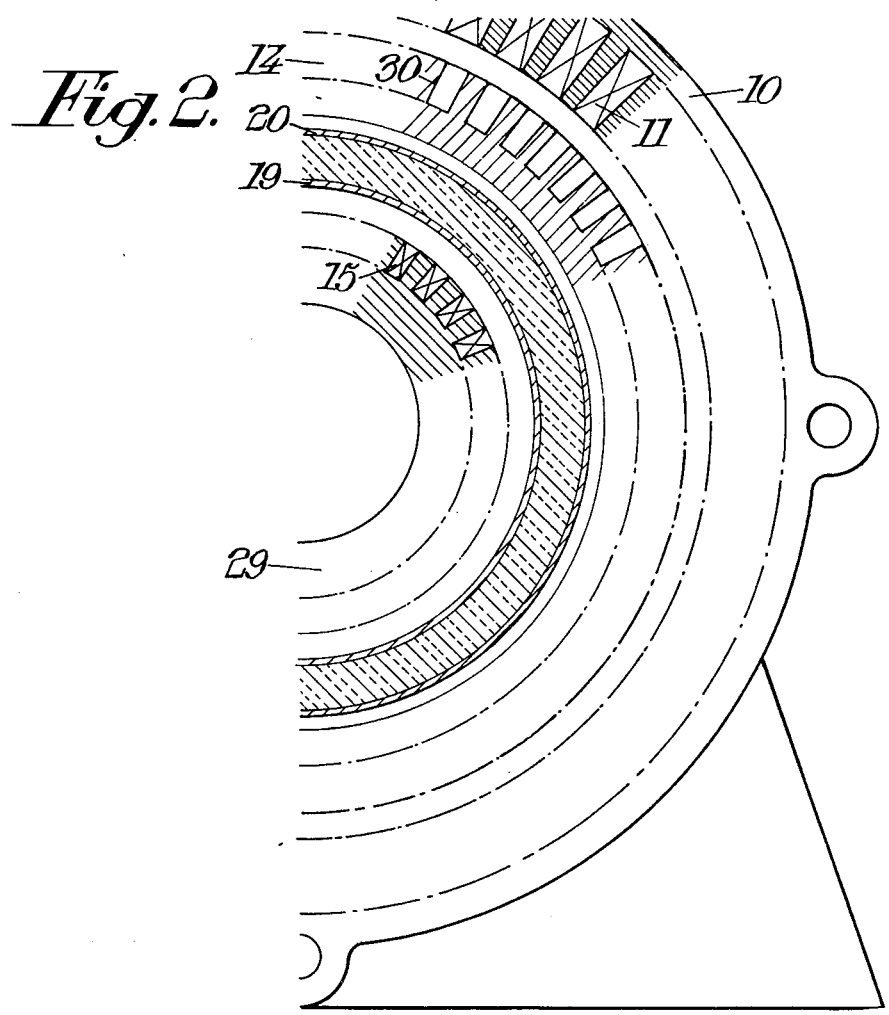
FIG. 2 is a diagrammatic view on an enlarged scale in section along line II—II of FIG. 1, showing further details.
Figure 3:
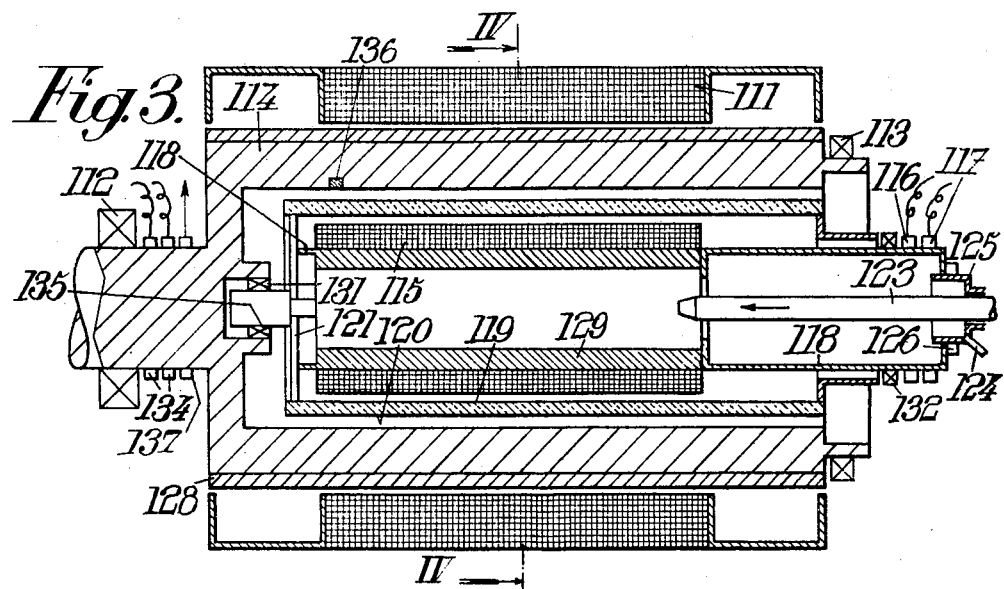
FIG. 3 is a diagrammatic view, in section on a plane passing through the axis of a two-pole three-phase synchronous machine according to a modified embodiment.
Figure 4:
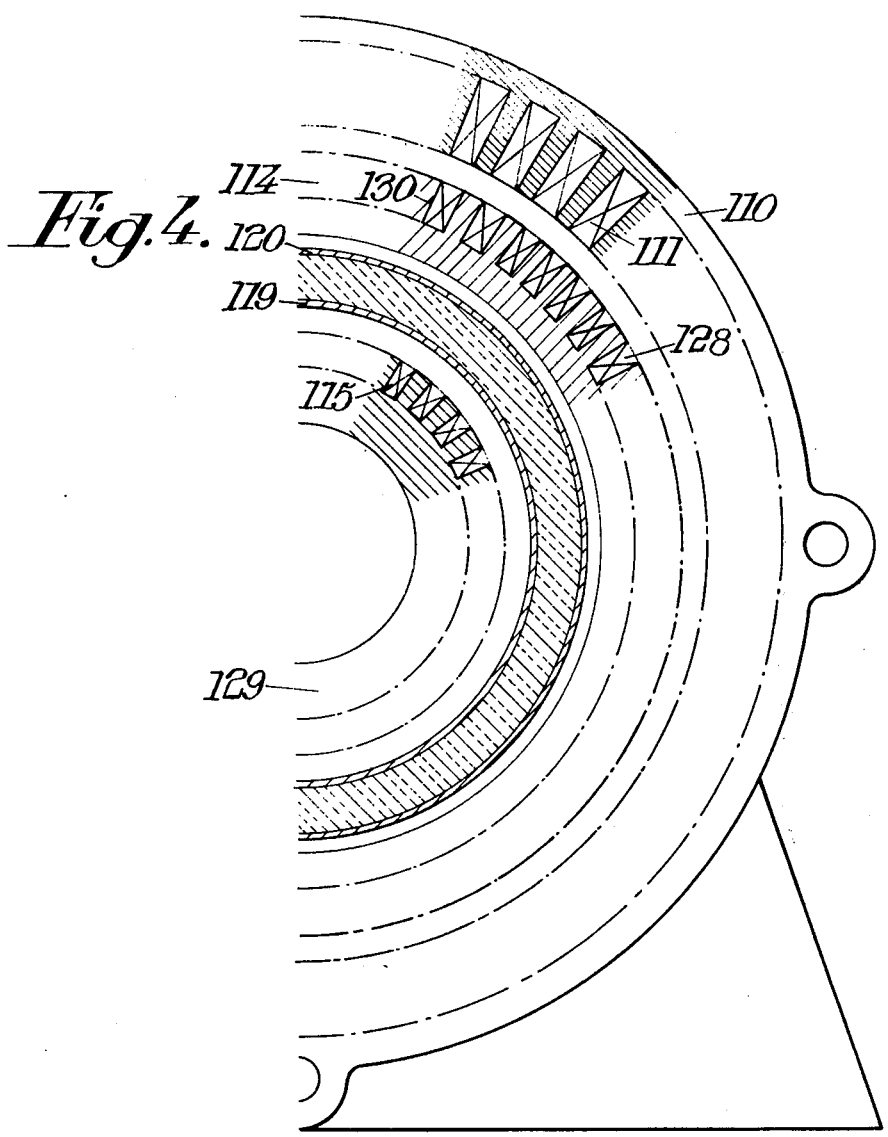
FIG. 4 is a diagrammatic view to an enlarged scale in section along line IV—IV of FIG. 3, showing extra details.

For the sake of simplicity it will be considered hereinafter that the rotating machines shown in FIGS. 1, 2 and in FIGS. 3 and 4 are two-pole three-phase alernators; correspondingly, the stator winding will hereinafter be called the "armature." However, the invention will also be of use in the case of operation as a synchronous motor. Also, the phase number may be other than three and there may be a plurality of pole pairs rather than one.

Figure 1:
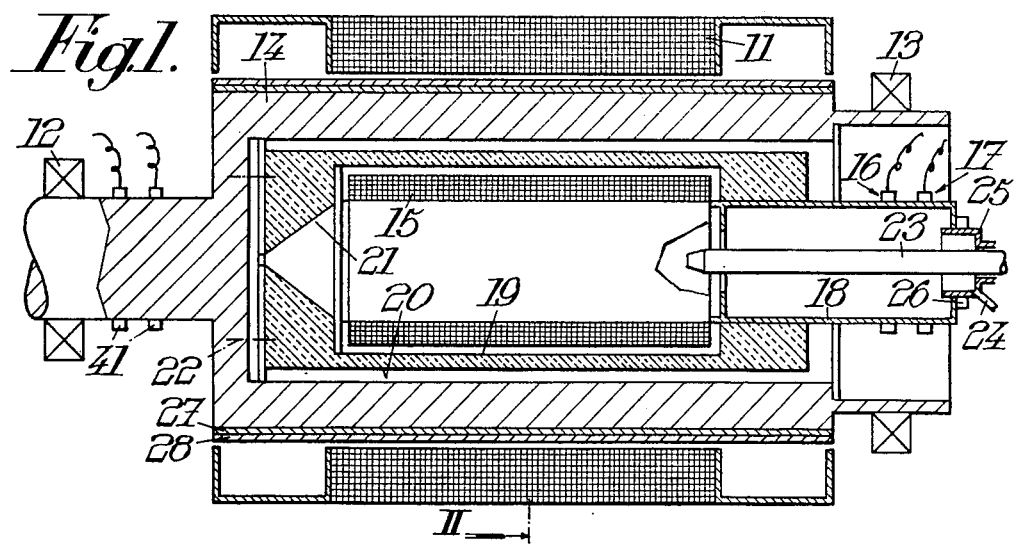
FIG. 1 is a diagrammatic view, in section on a plane passing through the axis, of a two-pole three-phase synchronous machine according to the invention.

The alternator shown in FIGS. 1 and 2 has a rotating system which is generally cylindrical and in which there are disposed coaxially, starting from the machine axis, a field winding located in a cryostat, a shaft to which mechanical power is applied, a passive screen and an auxiliary winding. However, a different arrangement can be used; for instance, starting from the axis the arrangement could be the field winding, the auxiliary winding and the screen. Also, although possibily less satisfactorily, a solid shaft could be used instead of a hollow shaft and all the windings and the passive screen could be disposed around the shaft.

The machine which is shown in FIG. 1 and which is synchronous alternator is of similar general construction to the machine described and claimed in U.S. patent application Ser. No. 412,127 the content of which is incorporated by way of reference. The alternator comprises a stationary frame 10 (FIG. 2) carrying a stator winding 11 and having the rotating system mounted in it. Stator winding 11 is connected, for instance, to an electric power network and is made of a material, such as copper or aluminum, which is a good electrical conductor at the normal operating temperatures for the armature windings of conventional alternators. In operation, rotation of the field winding and of the auxiliary winding of the rotating system, to be described hereinafter, induce electromotive forces in the armature 11.

At its ends the frame 10 has bearings 12, 13 for centering a rotating hollow shaft 14. The bearings 12, 13 are far enough away from the armature and from the windings of the rotating system for the magnetic flux passing through them to remain at a reduced level.

The rotating system comprises a superconductive field winding 15 which in this embodiment is two-pole and is flowed through by the d.c. exciting current of the machine, such current being constant in steady-state operating conditions. Winding 15 is embodied in accordance with the conventional technology for superconductive magnets and so need not be described here in detail. The superconductive material can be inter alia of the composite multifilament kind associating elementary filaments of an alloy of niobium and of titanium embedded in a copper matrix and shaped into wires of circular or rectangular cross-section. The various elementary conductors, appropriately insulated and to a number sufficient to provide an overall current distribution producing a two-pole field, are received, e.g., in grooves or slots in the periphery of a cylindrical former 29. The same, which can be seen in FIG. 2, can be made of steel (which can be magnetic or non-magnetic since the inductances are very high) or of an insulating material or of a metal which has high mechanical strength and is a good heat conductor. Plastics, if used, is, advantageously, fiber reinforced. Of usable metal products there can be mentioned inter alia light aluminum-based alloys. The field winding 15 and its former 29 having cooling passages through which cryogenic fluid can flow. The field winding 15 must be rigidly secured to the former 29 since it experiences magnetic stresses from its own field and centrifugal mechanical stressing in operation. The rigid correction can be provided by means of slot shims of a material having a high mechanical strength or metal rings or impregnation with a thermosetting resin. The processes just mentioned can of course also be used in combination.

The field winding 15 must be d.c. energized at least for the starting period. This energization or excitation can be provided either by means of an end-of-shaft exciter associated with static rectifiers or by external means. The external means solution is the one shown by way of example in FIG. 1 which shows rubbing contacts 16, 17 comprising fixed brushes and rings disposed on a sleeve 18 connected to the former 29. The conductors connecting the rubbing contacts to the field winding 15 are disposed inside the sleeve 18 and must of course be so devised as to ensure very little heat transfer to the low-temperature zone.

Advantageously, whatever means are used to excite the field winding during acceleration to operating speed, such winding comprises a superconductive switch which is open during the run-up to the operative speed and which closes in steady-state conditions so as to short-circuit the field winding and trap the flux required for operation. Also, excitation can be interrupted.

The field winding is disposed inside a cryostat comprising an inner wall 19 and an outer wall 19. The field winding is secured to wall 20 by means of centering members which in the embodiment described comprises the sleeve 18 and webs 21. Wall 20 is centered in the shaft and secured thereto by elements 22 which must have a very high thermal strength but which need only very little mechanical strength.

Between the cryostat and the shaft 14 there is heat insulation which can be in the conventional form of a double-walled vacuum jacket or of a conventional superinsulation. An intermediate-temperature screen which is, e.g., flowed through by liquid nitrogen at a temperature of 77° K can also be used either on its own or together with the means just referred to. The elements 22 can take the form of cheeks or structural elements which are symmetrical in revolution and which are made of low heat conductivity stainless steel. The connections can be of very reduced cross-section since, as will be seen hereinfter, the rotational torque applied to the field winding relatively to the shaft is usually small and, in balanced steady-state operating conditions, even zero.

The cryostat must have provision for being supplied with fluid to maintain cryogenic tempertures. In the diagrammatic embodiment, such provision comprises a central tube 23 which extends to inside the field winding former 29 and through which a cryogenic fluid, such as liquid helium or even better hypercritical helium is injected. The evaporated helium returns to the space between the tube 23 and the sleeve 18 (advantageously, the latter has insulation). The helium is discharged through a duct 24 extending to a stationary header 25 cooperating with the sleeve end face with the interposition of a rotating seal 26.

A passive screen 27 and an auxiliary winding 28 are disposed on shaft 14 and in the embodiment shown are both disposed outside the shaft with the auxiliary winding 28 outermost. The shaft is made of a high-strength material which can be magnetic steel, or, as a rule, non-magnetic steel. The shaft can be formed with radial slots 30 which are open to the outside for the positioning of the wiring forming the screen 27 and the auxiliary winding 28.

The screen 27 can be of the kind conventionally used in a superconductive-field alternators to screen the superconductive material from the effects of the variable interfering magnetic fields produced by disturbances of the armature. Sceen 27 is usually embodied as a short-circuited winding identical to the squirrel-cage rotors of asynchronous motors.

In the embodiment shown in FIG. 2, the screen winding is received in slots 30 in shaft 14, such slots also receiving the elements which form the auxiliary winding 28. For the sake of simplicity only a few of the slots are shown in FIG. 2.

Also disposed on shaft 14 is the auxiliary winding 28 which is, with advantage, embodied as a winding in phase quadrature with the field winding, so that the torque tending to rotate the field winding 15 relatively to the shaft 14 can be cancelled or at least reduced to a very low value by means of a very reduced current flow through the auxiliary winding 28 — i.e., with very reduced heat dissipation therein.

The two-pole auxiliary winding 28 can be constructed on the basis of conventional turbo-alternator rotor winding techniques. Since the magnetic flux produced by the field winding is a very decreasing function of the radial distance from the surface of the field winding 15, the auxiliary winding 28 and the shaft 14 must be as thin as is compatible with mechanical strength requirements and with the required current flow through the winding 28. Since the same must be maintained at a temperature compatible with the use of conventional electrical insulants, it must have a cooling circuit (not shown). As a rule, water cooling is used, but cooling by a cryogenic fluid at a temperature between the superconductivity temperature and the ambient temperature can also be used. Inter alia cooling by a flow of liquid nitrogen can be used.

The auxiliary winding 28 must be excited by a d.c. of a strength proportional to the strength of the power component of the a.c. output by the armature 11. There are two practical solutions of this particular problem.

A first solution, which is the one used in the embodiment of FIG. 1, entails using an external d.c. generator (not shown) and a current feed by way of a rubbing contact. FIG. 1 gives a diagrammatic view of rubbing contacts 41 comprising rings and brushes, the supply wiring to the brushes and from the rings to the winding 28 not being shown. Another possibility is to use current collection by means of a liquid metal, as a rule sodium or mercury. Advantageously, the external d.c. generator takes the form of static rectifiers.

Another solution is to provide an end-of-shaft exciter outputting to static rectifiers rotated by the shaft.

In both cases the auxiliary winding exciting current must be under the control of the power component of the output current from alternator armature 11. Such control can be a very simple matter to arrange and comprise just a watt meter facility which delivers the value of the power component to a voltage divider, such as an autotransformer, disposed between the exciting means and the rectifiers. A more complicated solution which further reduces mechanical jerks during transient conditions is to use a control circuit having differentiating-integrating (DI) circuits. In all cases the magnitude of the power required for the auxiliary winding is something like 0.1% of the alternator output capacity.

Armature 11 is embodied by a distributing three-phase two-pole winding constructed of a material, such as copper or aluminum, which is a good electrical conductor and which is force cooled, e.g., force water cooled. The conduction must be subdivided and transposed to reduce eddy current losses.

In the embodiment shown in FIG. 2, the armature winding 11 is received in slots in a stator support which can be either a fiber reinforced insulant or a magnetic or non-magnetic steel; in the latter case the stator support is laminated in planes perpendicular to the machine axis to reduce losses. No further description will be given of conductor distribution and insulation in the slots since the technology concerned is known and has already been used in the manufacture of armatures for conventional alternators and superconductive-field alternators.

The resulting alternator has the advantage both of having a field winding rigidly secured to its drive shaft, thus precluding any slip between these two items, and of providing a high-thermal-resistance portion on the thermal path between the shaft and the superconductive field unit, thus considerably reducing the capacity needed for the cryogenic installation.

The alternator shown in FIGS. 3 and 4 is of similar general construction to the one described with reference to FIGS. 1 and 2 and so will be given only a brief description. It comprises a field winding disposed inside a cryostat and, therearound, the shaft to which the driving power is input and which carries an auxiliary winding, and a stationary frame 110 bearing a three-phase stator winding or armature 111. Disposed at the ends of frame 110 are bearings 112, 113 for centering the hollow rotating shaft 114; the bearings 112, 113 are separated from the armature and from the rotating windings to reduce the magnetic flux flowing through them.

A superconductive field winding 115, which in this embodiment is bipolar, is flowed through by the d.c. exciting current which is constant in steady-state conditions of operation. Winding 115 is constructed according to the normal technology for superconductive magnets. Winding 115 is placed in grooves or slots in the periphery of a cylindrical former 129 which can be seen in FIG. 4 and which can be made of steel or of an insulant or of a metal which has good mechanical strength and is a good heat conductor. Winding 115 is d.c. excited at least during the starting period either by a shaft exciter or externally by way of rubbing contacts 116, 117 comprising stationary brushes and rings disposed on a sleeve 118 connected to the former 129.

Winding 115 is also disposed in a cryostat comprising an inner wall 119 and an outer wall 120, the latter possibly embodying or carrying the damping and conductive screen providing shielding against the field winding. The same is secured to outer wall 120 by sleeve 118 and webs 121. The cryostat has provision for the supply of a fluid for maintaining cryogenic temperatures, such provision comprising a central tube 123 through which such fluid is injected. The evaporated helium returns to the space between tube 123 and sleeve 118 (advantageously, sleeve 118 has insulation). Helium is removed through a duct 124 which extends to a stationary header or collector 125. Shaft 114, which is made of a high mechanical strength material, such as magnetic steel, or, as a rule, non-magnetic steel, carries an auxiliary winding 128 and a damping winding (not shown).

Whereas the field winding of the alternator of FIGS. 1 and 2 is maintained at an angle to the shaft 114 (as a rule, in phase quadrature), the field winding of the machine of FIGS. 3 and 4 has some provision for rotation relatively to the shaft. Accordingly, the field winding is borne by two bearings 132, 135, one of which is stationary and the other of which is disposed in a recess in shaft 114. The other of the two bearings can also be disposed on the shaft.

Figure 5:
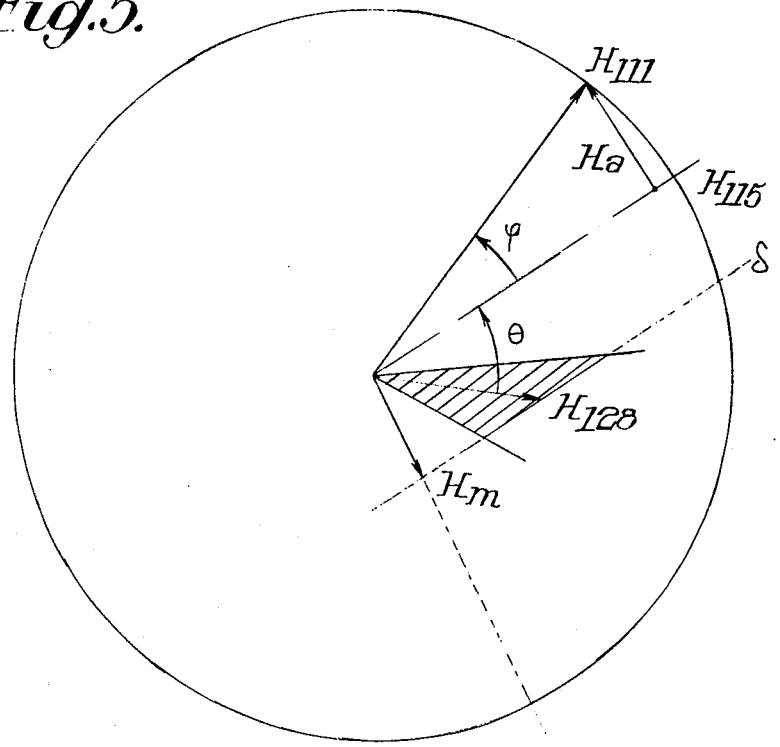
FIG. 5 is an explanatory diagram showing the relationship between field directions in the machine of FIG. 3.

For a better understanding of the invention, reference may usefully be made at this stage to the vector diagram of FIG. 5 showing the rotating field $H_{111}$ produced by the currents in the stationary winding 111, and the field $H_{115}$ produced by the rotating field winding 115. The phase shift $\phi$ between $H_{111}$ and $H_{115}$ depends upon the characteristics of the network being supplied, and such characteristics may alter in the course of time.

The rotating field $H_{128}$ produced by the auxiliary winding 128 must always balance the power component $Ha$ of $H_{111}$ — i.e., its component perpendicular to $H_{115}$.

In the case shown in FIGS. 1 and 2, this result is achieved by means of an auxiliary winding in quadrature with the field winding, by the flow of a current through the auxiliary winding which produces a field $\vec{Hm} = -\vec{Ha}$.

In the present case, on the one hand, the auxiliary winding takes up its equilibrium orientation as a result of having flowing through it a current $H_{128}$ such that balance is reached at an angle $\theta$ between a bottom limit chosen, for instance, to be 30°, to keep down power consumption, and a top limit, for instance, 60°, to preclude any risk of going out of step in the event of jerks; ceteris paribus any change in the current flowing through winding 128 causes the end of vecter $H_{128}$ to move along $\delta$ parallel to $H_{115}$.

To achieve the required result, the auxiliary winding 128 may be so energized via the rubbing contacts 134 that $H_{128}$ does not depart towards $Hm$ from the hatched zone when $Ha$ is maximum. Since this solution results in important losses and lower yield, it is preferable to provide permanent sensing, e.g., by means of a field sensor 136, of the offset between 115 and 128 and to send the corresponding signal to a control circuit (not shown) by way of a third rubbing contact 137. The control circuit increases the current when $H_{128}$ leaves the predetermined angular zone (shown hatched) in the direction of $Hm$ and decreases the current when $H_{128}$ leaves the zone in the direction of $H_{115}$.

We claim:

1. A polyphase synchronous electrical machine comprising a superconducting D.C. field winding for providing a rotating, at least bipolar magnetic field, stationary windings adapted to produce a field which rotates about the longitudinal axis of the machine when a polyphase alternating current flows through said windings; means for notatably supporting said field winding inside said stationary windings coaxially of a rotating torque transmission shaft carrying an auxiliary winding; and an exciting circuit for circulating in the auxiliary winding a field-producing D.C. current and for adjusting said D.C. current delivered by an external source in the auxiliary winding at a value so related to the power component of the current flowing through the stationary windings as to maintain synchronism between the field winding and the auxiliary winding.

2. A machine according to claim 1, wherein the shaft is hollow and a cryostat in which the field winding is disposed is located inside the shaft.

3. A machine according to claim 1, having means for flowing water at a temperature near the ambient temperature or a cryogenic liquid at a temperature intermediate the ambient temperature and the temperature of the field winding in the auxiliary winding.

4. A machine according to claim 1, having an electrical protection and damping screen carried by the shaft and located between the field winding and the stationary windings.

5. A machine according to claim 4, wherein the field winding is located radially inwardly of the screen, the screen is radially inwardly of the auxiliary winding and the auxiliary winding is radially inwardly of the stationary windings.

6. A machine according to claim 4, wherein the shaft is formed with radial slots receiving electrical conductors of the auxiliary winding and of the screen.

7. A machine according to claim 1, wherein the field winding is secured to the shaft by supports which are of reduced mechanical strength and high resistance to heat flow.

8. A machine according to claim 7, wherein the exciting circuit has means for detecting any torque tending to rotate the field winding relatively to the shaft and means operatively connected to said detecting means for continuously adjusting the current in said auxiliary winding to a value such that said torque is substantially zero.

9. A machine according to claim 1, wherein the field winding is freely rotatable relatively to the shaft and the exciting circuit has means for adjusting the current in the auxiliary winding to a value such that the angular offset between the auxiliary winding field and the field produced by the field winding does not exceed a predetermined value which is less than 90°.

10. A machine according to claim 9, characterized in that the predetermined value is about 60°.

11. A machine according to claim 9, wherein the adjusting means are arranged to alter the auxiliary-winding current when the offset departs from a predetermined range of values.

12. A machine according to claim 11, characterized in that the adjusting means comprise a stationary detector of the angular offset.

13. A machine according to claim 1, having a D.C. generator providing current to the field winding at least at starting.

* * * * *